Nov. 8, 1949     R. LEPSOE     2,487,770
ELECTRIC FURNACE

Filed Feb. 11, 1946     2 Sheets-Sheet 1

Robert Lepsoe
Inventor
by
F. Harold Fuches
Attorney

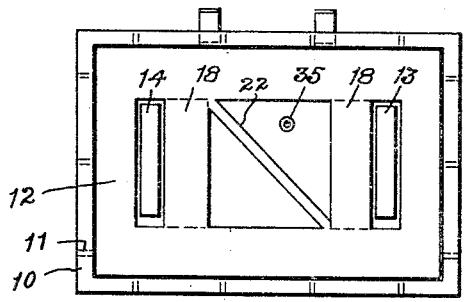
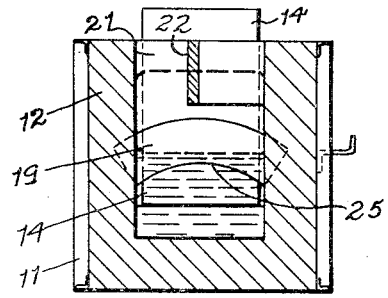
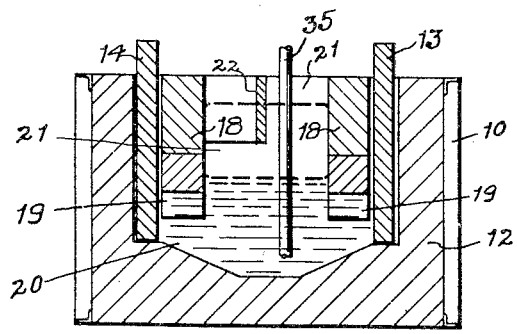

Patented Nov. 8, 1949

2,487,770

UNITED STATES PATENT OFFICE 2,487,770

ELECTRIC FURNACE

Robert Lepsoe, Trail, British Columbia, Canada, assignor to The Consolidated Mining and Smelting Company of Canada, Limited, Montreal, Quebec, Canada, a corporation of Canada Application February 11, 1946, Serial No. 646,844

3 Claims. (Cl. 13—23)

This invention relates to an electric furnace and is particularly directed to providing an electric resistance furnace for melting light metals and alloys thereof, such as magnesium and its alloys, wherein the metal or alloy is melted in the presence of a flux of higher specific gravity, and in molten condition normally floats on the flux.

The melting of light metals and alloys such as magnesium and its alloys, presents problems due to the high reactivity of the metals and alloys, and their susceptibility to contamination. Such metals and alloys are ordinarily melted in an externally heated steel pot or crucible. This procedure has the disadvantages that the pots or crucibles are limited to relatively low production rates, the steel castings are relatively costly and the length of service of the pots and crucibles is relatively short, and frequent inspection of the pots in necessary to anticipate danger from leakage. Also, the steel of the pot is a source of iron contamination and subsequent precipitation methods are necessary to remove the iron from the molten metal. Also, a reverbatory furnace has been used for melting light metal and its alloys and while this type of furnace may be satisfactory in large scale operations, the metal from the furnace must subsequently be refined in the usual pots and crucibles. This type of furnace is not considered suitable for melting light metals in finely divided form or in the form of light scrap.

The subject of melting and refining magnesium is discussed at length in the American Institute of Mining and Metallurgical Engineers' Technical Publication No. 1708 by C. E. Nelson. This paper discusses at length the various procedures of the prior art on the subject.

A primary object of the present invention is to provide an electric resistance furnace in which light metals and their alloys, such as magnesium and its alloys, may be melted at relatively low cost, with high recovery of the metal of interest, with low consumption of flux and with low power consumption.

A further important object of the invention is to provide a novel electric resistance furnace construction in which the electrodes are shielded from exposure to corrosive and erosive action and short-circuiting by the metal of interest while still exposing a large electrode surface for contact with the flux which serves as a resistor for the generation of heat within the melting chamber.

A still further important object of the invention is to provide an electric furnace which is inexpensive in construction, easily operated, and from which a very high energy efficiency may be obtained.

The electric furnace of the present invention comprises, in general, a rectangular chamber defined by a refractory bottom, refractory side walls and refractory end walls, and within the upper part of said chamber a generally centrally positioned rectangular compartment defined by refactory side walls coincident with part of the side walls of said chamber, and refractory end walls each in the form of an arch extending across said chamber above the bottom thereof and separate from and generally parallel to the end walls of said chamber, an electrode positioned between each end wall of said chamber and the adjacent end wall of said compartment and extending from the top of said walls to the bottom of said chamber, the lower part of each electrode below said arches being adapted to be exposed to the contents of the lower part of said chamber.

An understanding of the manner in which the above and other objects of the invention are attained may be had from the following description, reference being made to the accompanying drawings in which:

Figure 2 is a top plan view of the furnace illustrated in Figure 1;

Figure 3 is a cross sectional side elevation; and

Figure 4 is a cross sectional end elevation;

Like reference characters refer to like parts throughout the specification and drawings.

Figure 1:
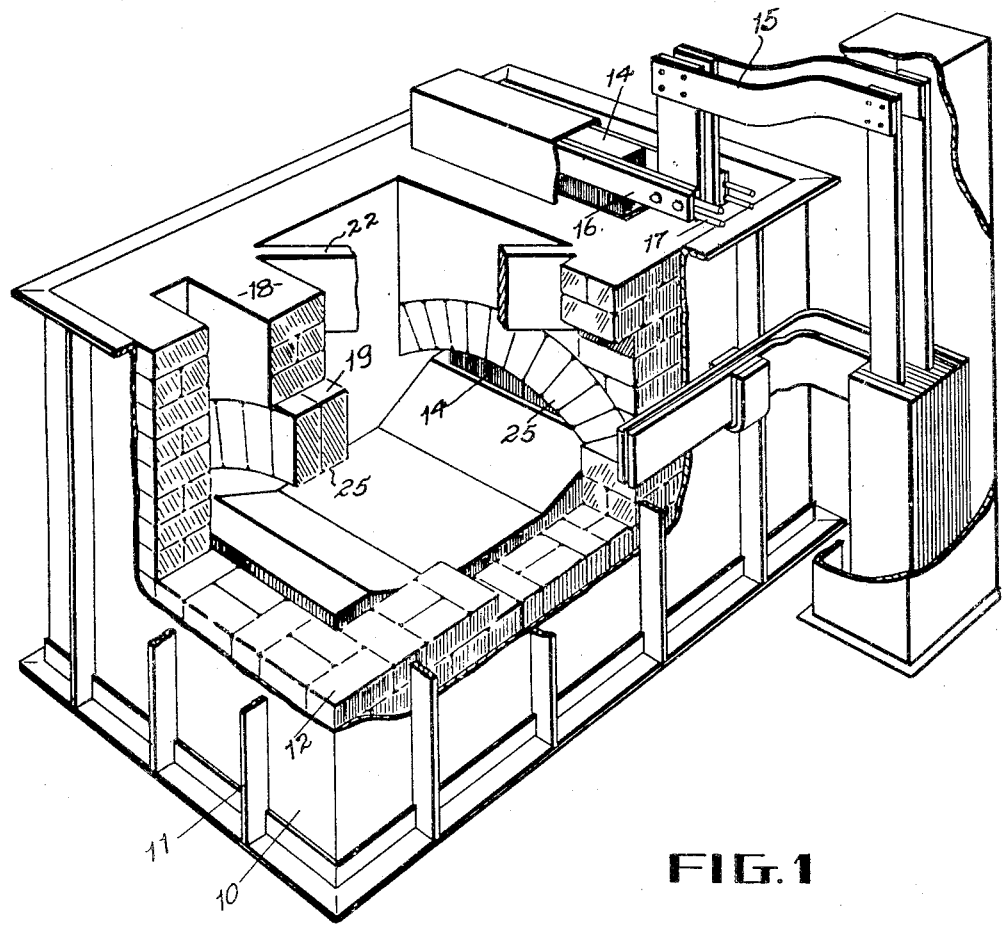
Figure 1 is a perspective view of an electric furnace incorporating the novel construction of the present invention, partly broken away to show details of the internal construction.

A preferred embodiment of an electric resistance furnace incorporating the improvements of the present invention comprises a rectangular shaped steel shell 10. The shell is preferably formed of steel plates reinforced by vertical ribs 11. The interior walls of the steel shell are lined with refractory 12 of low heat conductivity and, preferably, highly resistant to the corrosive and erosive action of molten metal and fluxes, a refractory of relatively high tensile strength and low porosity, such as that sold under the trademark "Duro" being suitable for this purpose. The inner walls of the lining 12 define the furnace chamber.

Electrodes 13 and 14 are suspended from above and extend vertically through the furnace chamber to a point adjacent to the base thereof. The electrodes are preferably in the form of carbon or graphite slabs and bus bars 15, connected to a source of A. C. electrical energy, are connected to the tops of the electrodes by pressure contact type electrode clamps 16. Pipes 17 extend through the clamps for circulating a coolant such as water therethrough for cooling purposes. The contact bars are preferably formed of material of high electrical conductivity, such as copper or a silver contact surface on a copper base.

The opposing faces of the electrodes 13 and 14 are shielded for a large part of their length by a refractory lining 18, which lining is supported on arches 19 positioned above the base of the chamber. The lining 18 and arches 19 thus form the chamber into an enlarged base 20 defined on two opposite sides by the lining 12 and on the other two sides by the exposed faces of the lower ends of the electrodes 13 and 14, and an upper part 21 restricted in section by the refractory lining 18 and arches 19. The refractory lining 18 and arches 19 are preferably formed of a high alumina content refractory with the joints well sealed with a refractory cement. A lining of brick such as that sold under the trade-mark "Duro" would also be satisfactory.

The operation of the furnace is relatively simple, and is described as applied to melting magnesium or an alloy of magnesium in the presence of a flux of higher specific gravity, such as a mixture of potassium chloride, magnesium chloride, barium chloride and calcium fluoride, in which the barium chloride content may be varied to control the density of the flux. For example, a flux of the composition 55% KCl, 34% MgCl₂, 9% BaCl₂, and 2% CaF₂ is satisfactory when melting pure magnesium metal, and other known fluxes may be used with equally satisfactory results, but for melting an alloy containing 50% magnesium and 50% aluminum, a flux containing 40% BaCl₂ was required. It is preferred that the density of the flux be so regulated that massive, solid metal sinks into the flux but that molten metal floats on the flux, i. e. the preferred density of the flux is between the density of the solid metal to be melted and the density of the molten metal.

In starting the furnace, flux is melted outside the furnace, for example in a melting pot, and is transferred to the furnace chamber in molten condition until sufficient molten flux has been charged to establish uninterrupted contact with the electrodes after which the current may be turned on and more flux added, either in solid or molten condition, until the level of the flux is above the bottom of the arches 19, the molten flux serving as a resistor connecting the electrodes and providing a path of high resistance for the flow of current between the electrodes.

When sufficient flux has been introduced into the lower part 20 of the furnace chamber, the temperature of the bath of flux is permitted to increase until a temperature has been reached above the melting temperature of magnesium, for example, about 750° C., and magnesium, preferably preheated to ensure dryness, is charged into the bath of flux until the level of the metal is well up in the restricted part 21 of the chamber.

It is preferred to agitate the bath during melting to improve the transmission and distribution of heat and increase the rate of melting. The bath may be agitated by introducing an inert gas such as nitrogen into the bath through a pipe 35, Figure 3, the open end of which is immersed to a level near the bottom of the furnace chamber. Dried or undried air may also be used for this purpose or the bath may be agitated mechanically.

As the magnesium melts, it rises in the restricted part 21 to form a metal well from which the molten magnesium can be ladled by hand or pump or tapped off by conventional methods for casting into desired shapes.

A preferred arrangement for charging and ladling or tapping the furnace is illustrated in Figure 2 in which a partition 22, such as steel or refractory is provided. This partition extends approximately diagonally in a vertical plane between two corners of the top of the chamber and depends into the molten metal to a level above the surface of the flux. In this embodiment, solid metal may be charged into the furnace in the triangular space at one side of the partition, and clean molten metal may be ladled or tapped continuously from the opposite side of the partition.

As a specific embodiment of the invention, a shell formed of one-quarter inch boiler plate with inside dimensions five feet, six inches long by three feet, six inches wide by three feet, ten inches deep is lined with brick sold under the trade-mark "Duro" to form a chamber 48 inches long by 24 inches wide by 36 inches deep. The electrodes are in the form of graphite slabs 20 inches wide, 3 inches thick, and 36 inches long and extend vertically from above the chamber to terminate adjacent to the bottom of the chamber, an electrode practically covering each end wall.

The refractory lining 18 is supported on the arches 19 and is about 9 inches thick. This lining serves to shield the electrodes from short circuiting and divides the chamber into a flux receiving compartment 39 inches long by 24 inches wide and of a depth at least to the level of the bottom 25 of the arches 19, which in this particular embodiment is 14 inches above the floor of the chamber, and a metal well 21 inches long by 24 inches wide and of a depth not greater than the distance from the top of the chamber to the level of the bottom 25 of the arches 19. About 150 kv.-a. is necessary to operate the furnace and should be available at 40 to 80 volts in about 10 volt steps and at an amperage up to 2,500. A simple tap arrangement may be provided to vary the load quickly with fluctuations in melting rate.

A furnace of this size holds about 500 pounds of metal and about 1,000 pounds of flux and has a capacity for melting about five tons of metal per eight hour shift.

The metal is melted and cast in much the same manner as in the conventional melting practice, with the important difference that the operation is semi-continuous rather than a batch process. Instead of starting with a new flux each time a batch of metal is cast, melting and casting are continued for an extended period of time. Powdered flux is sprinkled on the surface of the metal at intervals to protect the metal from oxidation. Usually, about once every 24 hours the flux is permitted to settle, and the mud is dredged from the furnace with additional new flux being added to bring the flux up to the required level. This procedure is continued until the flux deteriorates to an extent that it must all be discarded and a fresh supply introduced into the flux receiving chamber.

The electric furnace of the present invention has many advantages over the pots, crucibles, and furnaces of the prior art for melting light metals and their alloys. The electric furnace is relatively inexpensive to construct and is easily operated. It is capable of melting, with high metallurgical recovery, light metals in the form of ingots and light scrap, and in finely divided form. There is a very low consumption of flux, a very low power consumption and practically no electrode consumption. Also, the metal melted does not become contaminated with iron impurities as would be the case if the metal were melted in a steel pot or crucible according to standard practice. Instead of two electrodes, the furnace may be designed for three electrodes and three-phase current.

The following operating data relate to the performance of the furnace specifically described hereinabove. When melting a charge consisting of magnesium ingots, light scrap and metal powder and in which ingot metal comprised two-thirds of the charge, the metallurgical recovery was found to be 99%, flux consumption was 2% and power requirements were less than 500 kw.-h. per ton of metal cast from the furnace. With a charge consisting of magnesium crystals, the metallurgical recovery was 99% of the metallic magnesium content of the crystals; the flux consumption was 5% to 7%, and power requirements were less than 500 kw.-h. per ton of metal cast from the furnace.

What I claim as new and desire to protect by Letters Patent of the United States is:

1. An electric melting furnace comprising a rectangular chamber defined by a refractory bottom, refractory side walls and refractory end walls, and within the upper part of said chamber a generally centrally positioned rectangular compartment defined by refractory side walls coincident with part of the side walls of said chamber, and refractory end walls each in the form of an arch extending across said chamber above the bottom thereof and separate from and generally parallel to the end walls of said chamber, and an electrode positioned between each end wall of said chamber and the adjacent end wall of said compartment and extending from the top of said walls to the bottom of said chamber, the lower part of each electrode below said arches being adapted to be exposed to the contents of the lower part of said chamber.

2. An electric melting furnace comprising a rectangular chamber defined by a refractory bottom, refractory side walls and refractory end walls, and within the upper part of said chamber a generally centrally positioned rectangular compartment defined by refractory side walls coincident with part of the side walls of said chamber, and refractory end walls each in the form of an arch extending across said chamber above the bottom thereof and separate from and generally parallel to the end walls of said chamber, and an electrode positioned between each end wall of said chamber and the adjacent end wall of said compartment and extending from the top of said walls to the bottom of said chamber, the lower part of each electrode below said arches being adapted to be exposed to the contents of the lower part of said chamber, and means exterior of the furnace for connecting said electrodes to a source of electrical energy.

3. An electric melting furnace comprising a rectangular chamber defined by a refractory bottom, refractory side walls and refractory end walls, and within the upper part of said chamber a generally centrally positioned rectangular compartment defined by refractory side walls coincident with part of the side walls of said chamber, and refractory end walls each in the form of an arch extending across said chamber above the bottom thereof and separate from and generally parallel to the end walls of said chamber, and an electrode positioned between each end wall of said chamber and the adjacent end wall of said compartment and extending from the top of said walls to the bottom of said chamber, the lower part of each electrode below said arches being adapted to be exposed to the contents of the lower part of said chamber, a partition vertically disposed in the upper part of said compartment, and means exterior of the furnace for connecting the electrodes to a source of electrical energy.

ROBERT LEPSOE.

REFERENCES CITED

The following references are of record in the file of this patent:

UNITED STATES PATENTS

| Number | Name | Date |
| --- | --- | --- |
| 503,929 | Hall | Aug. 22, 1893 |
| 742,419 | Harmet | Oct. 27, 1903 |
| 750,096 | Cowles | Jan. 19, 1904 |
| 750,170 | Cowles | Jan. 19, 1904 |
| 757,621 | Horry et al. | Apr. 19, 1904 |
| 825,234 | Morehead | July 3, 1906 |
| 932,835 | Trillon | Aug. 31, 1909 |
| 941,768 | Dieffenbach | Nov. 30, 1909 |
| 1,002,286 | Lindblad | Sept. 5, 1911 |
| 1,026,281 | Reid | May 14, 1912 |
| 1,068,643 | Franklin | July 29, 1913 |
| 1,111,050 | Wile | Sept. 22, 1914 |
| 1,267,317 | Erskine | May 21, 1918 |
| 1,552,555 | Gravel | Sept. 8, 1925 |
| 1,655,324 | Miguet | Jan. 3, 1928 |
| 1,741,469 | Long | Dec. 31, 1929 |
| 1,763,248 | Moore | June 10, 1930 |
| 1,795,933 | Cripe | Mar. 10, 1931 |
| 2,114,231 | Moore | Aug. 12, 1938 |
| 2,227,938 | Krebs | Jan. 7, 1941 |
| 2,429,959 | Peake et al. | Oct. 28, 1947 |

FOREIGN PATENTS

| Number | Country | Date |
| --- | --- | --- |
| 422,868 | Great Britain | Acc. Jan. 21, 1935 |
| 529,891 | Great Britain | Acc. Nov. 29, 1940 |
| 557,262 | Great Britain | Acc. Nov. 12, 1943 |
| 225,662 | Switzerland | Pub. May 17, 1943 |

OTHER REFERENCES

Nelson: American Institute of Mining and Metallurgical Engineers Tech. Pub. #1708, 13 pages Metals Technology, August 1944 (Patent Office #TN-I).